Figure 1:
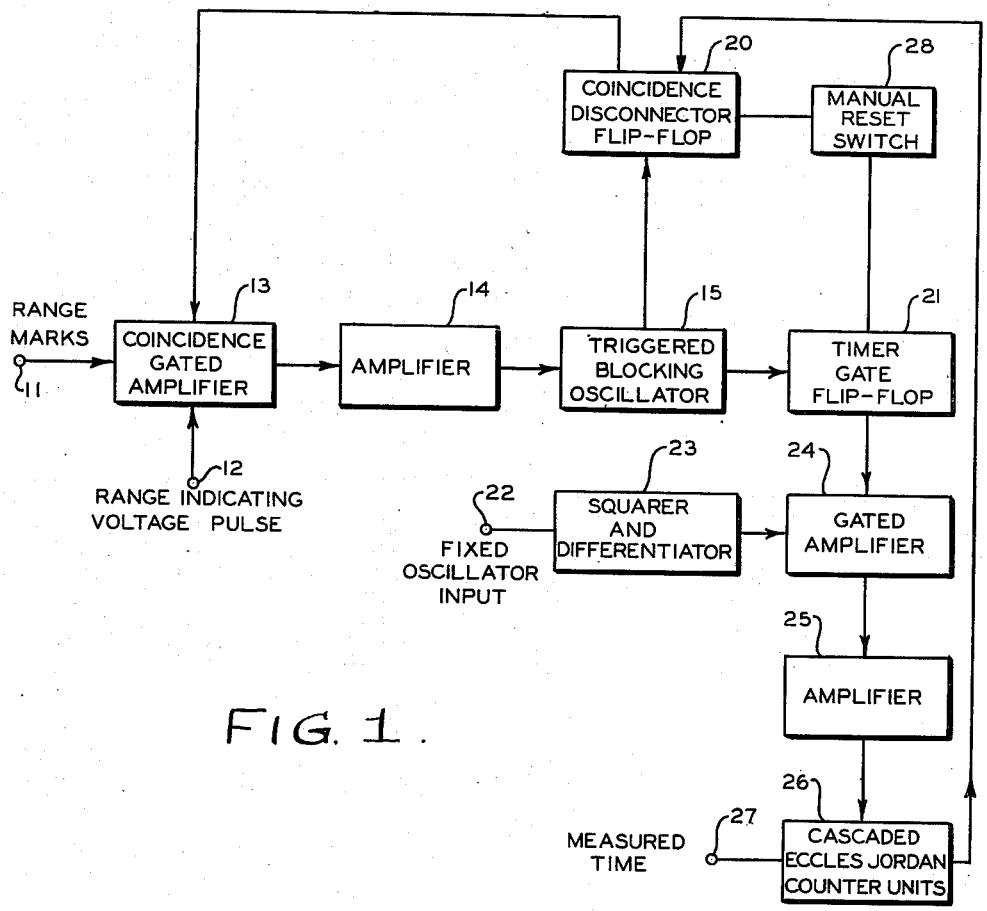

Oct. 23, 1956 I. H. SUDMAN 2,768,349
ELECTRONIC TIMER FOR SPEED MEASUREMENT
Filed May 29, 1946 2 Sheets-Sheet 1

INVENTOR
ISRAEL H. SUDMAN
BY
ATTORNEY

INVENTOR
ISRAEL H. SUDMAN

United States Patent Office 2,768,349
Patented Oct. 23, 1956

2,768,349

ELECTRONIC TIMER FOR SPEED MEASUREMENT

Israel H. Sudman, Ithaca, N. Y., assignor, by mesne assignments, to the United States of America as represented by the Secretary of the Navy Application May 29, 1946, Serial No. 672,952

8 Claims. (Cl. 324—70)

This invention relates to electronic interval timers and more particularly to electronic relays having an accurately controlled time of operation.

There are many applications of electronic systems to the problem of time measurement. The basic element of such systems is an oscillator having a stable operating frequency and apparatus to count the number of cycles of the output of that frequency occurring during the chosen time interval. For the purpose of measuring the time interval between two events the usual practice is to feed the output of the oscillator to pulse shaping circuits to produce sharply defined voltage pulses having a predetermined recurrence frequency. The accurately timed voltage pulses so produced are fed to an amplifier which is adapted to be biased on only during the interval to be measured, and counters actuated by the output of the amplifier will give an accurate measurement of the interval duration. This system requires an electronic relay circuit to change the bias on the amplifier at the beginning and end of the time interval, or as it is commonly called, gating the amplifier. In previous circuits used to produce the timer voltage gate, the input signals to the relay system were fed to separate triggering circuits, one of which triggered the gate generator on and the other triggered the gate generator off. A circuit is here proposed that uses a single triggering circuit for turning on and off the timer gate generator.

In cases where successive events occur it is sometimes desirable to time the interval between two non-successive events. In applications of this nature the electronic relay for producing the timer voltage gate must respond to the desired events rather than successive events. In the previously used circuits with two triggering circuits for the timer gate generator, the signals representing the occurrence of the events between which the time interval is to be determined are separated and fed into the triggering on and triggering off circuits for the relay system respectively. In the proposed circuit with the input signals applied to one triggering circuit, the segregation of signals is achieved by electronically disconnecting the triggering circuit from the input circuit for a fixed time following the start of the timer voltage gate. Under these conditions, signals occurring during the time that the input circuit is disconnected will not be able to trigger off the timer gate generator; and the first signal input following this preset time interval triggers off the basic trigger gate generator.

The illustrative description of the operation of this invention is based upon its application in determining the velocity of projectiles. In the application of the invention, the events that are used to trigger on and off the timing gate generator are the passage of the projectile being timed as it passes a first and second range. The signal inputs to the proposed timer circuit are obtained from a radar system employing automatic range tracking. Range mark voltages and the range indicating voltages are applied to the input circuits of the timer gate generator which is a gated coincidence amplifier. The signal triggering on the timer gate generator is produced by coincidence of the first range mark and the range indicating voltages. The input circuit is disconnected during the time that the coincidence between the second range mark and range indicating voltages occurs, and the timer gate generator is triggered off by coincidence between the third range mark and the range indicating voltages. This permits the timing portion of the circuit to accurately time the interval during which the projectile is passing through the selected distance.

A primary object of this invention is to provide a timer voltage gate generator.

Another object of this invention is to provide a timer voltage gate generator being started and stopped by a single coincidence circuit.

Figure 2:
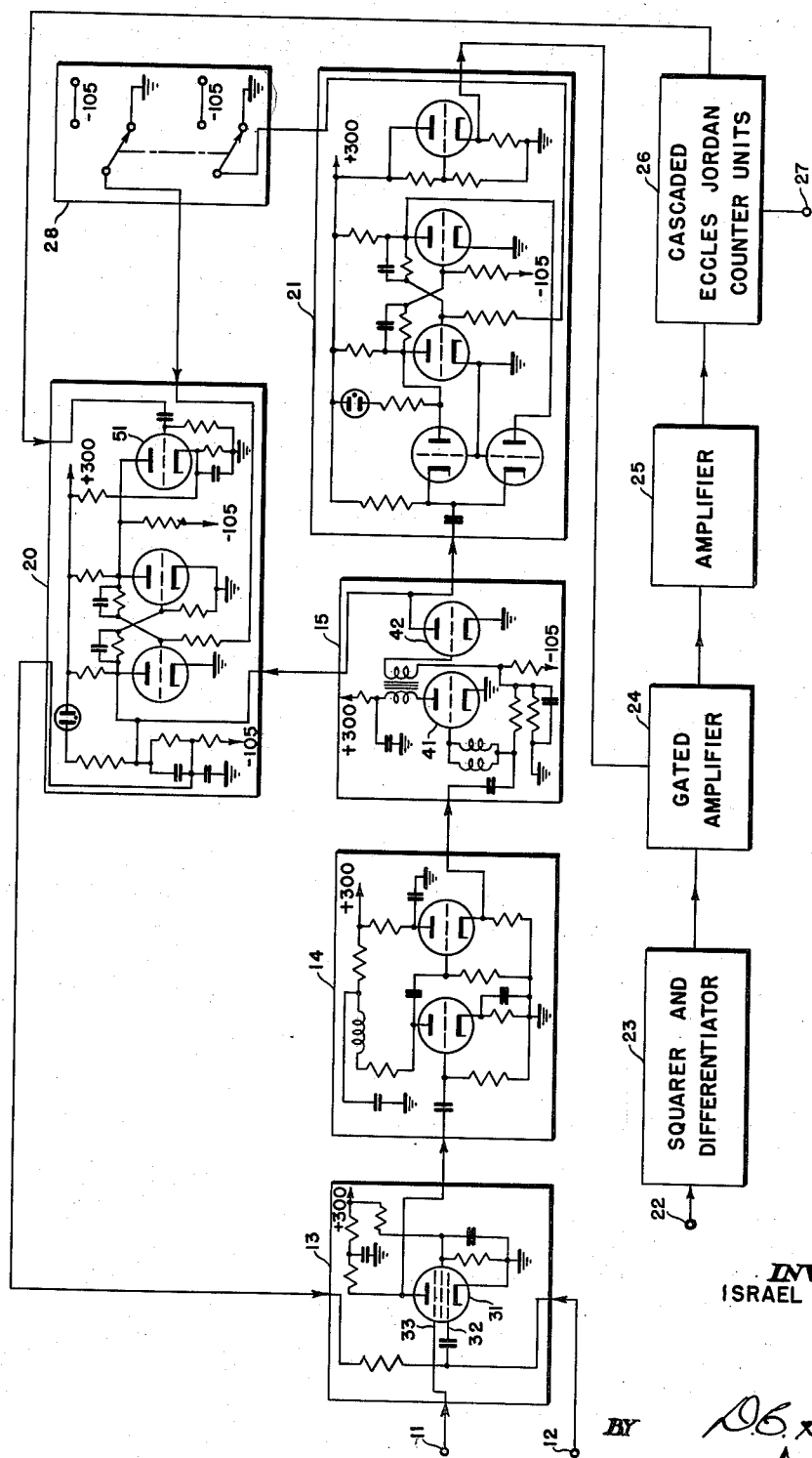

These and other objects will be apparent from the following description when taken with the accompanying drawing in which Fig. 1 is a schematic block diagram of one embodiment thereof, and Fig. 2 represents a circuit diagram of the connections between the several conventional components of Fig. 1.

Referring to the drawing, the circuit is intended to be operated with a conventional radar set (not shown) with positive range mark voltage pulses impressed on terminal 11 and a positive voltage pulse, occurring at the range of the radar target, applied at terminal 12. Referring to Fig. 2, these two inputs are applied to coincidence gated amplifier 13 consisting of a pentode 31 with the range marks applied to the control grid 32 and the range indicating voltage pulse to the suppressor grid 33 of the pentode. A signal output pulse from amplifier 13, developed when these two signals appear coincidentally, is applied through amplifier 14, an amplifier of the conventional cathode follower type, to triggered blocking oscillator 15. Blocking oscillator 15 has a negative bias applied to the grid of triode 41 so that the blocking oscillator goes through one complete cycle of operation upon application to its grid circuit of a signal voltage output pulse from amplifier 13, amplified by amplifier 14. The voltage pulse output of triggered blocking oscillator 15 is amplified by triode 42 before application to trigger on coincidence disconnector flip-flop circuit 20, and timer gate flip-flop circuit 21. Coincidence disconnector flip-flop circuit 20 is a conventional Eccles-Jordan driven multivibrator circuit adapted to be triggered on by the output of triggered blocking oscillator 15 and triggered off by a pulse applied from a counter circuit 26 as hereinafter described. The voltage gate output from circuit 20 is applied to the control grid 32 of coincidence gated amplifier 13 in such a manner so that the amplifier is biased to cut-off during its presence. The control grid 32 of pentode 31 is driven negative during this gate to such an extent that coincidence between range mark and range indicating voltages at the input will not produce a signal output. Timer gate flip-flop circuit 21 is a modified Eccles-Jordan circuit having an electron tube input circuit arranged so that a first pulse output from triggered blocking oscillator 15 triggers on the circuit, causing a voltage gate output to start and the next successing output pulse from blocking oscillator 15 triggers off the circuit, stopping the voltage gate output. Fixed frequency oscillations from a separate source (not shown) are applied at terminal 22 and then to a conventional squarer and differentiator circuit 23 produce voltage pulses of fixed repetition frequency which are applied to the input of conventional gated amplifier 24. The timer gate output from timer gate generator circuit 21 is used to bias amplifier 24 to conduction so that pulses occurring at the input appear at the output of gated amplifier 24 for the time duration of the timer voltage gate output. This output, amplified by conventional amplifier 25, is applied to the input of a number of cascaded Eccles-Jordan circuits used as counter circuits represented by block 26. An output from the counter circuit of block 26 is applied after a predetermined time interval to disconnector flip-flop circuit 20 through triode 51 to trigger off the circuit, terminating the disconnector gate output to gated amplifier 13 and restoring its bias for operation by coincidence between the next occurring range mark and range indicating voltages to produce an output pulse. When this coincidence occurs, triggered blocking oscillator 15 is again fired causing timer gate flip-flop circuit 21 to be returned to its original state stopping the timer voltage-gate output. The termination of timer voltage gate biases amplifier 24 to nonconduction and prevents further timing pulses from reaching counter units 26 from circuit 23. Another output from counter circuit 26 is made available at terminal 27 and is an indication of the time elapsed between the first and second coincidences in gated coincidence amplifier 13. Manual reset switch 28 is connected to flip-flop circuits 20 and 21 to restore them to the normal biased quiescent condition after their use in the timing of an interval.

Referring to Fig. 1 for the operation of this embodiment of the invention for timing the flight of projectiles, it is customary to apply 1000 yard range marks to terminal 11 with the first occurring at 1500 yards. As it is desired to time the flight of the projectile from 1500 to 3500 yards, the range pulse representing the range of the projectile in coincidence with the 1500 yard range mark starts the timing voltage gate and in coincidence with the 3500 yard range mark stops the timing voltage gate. Gated amplifier 13 must, of necessity, be disabled when the range pulse passes the 2500 yard mark to prevent turning off the timing voltage gate after only 1000 yards. In order to prevent this, coincidence between the 1500 yard range mark and the range pulse produces an output from amplifier 13, firing blocking oscillator 15, and triggering flip-flop circuits 20 and 21. This produces a negative voltage disabling gate applied to gated amplifier 13 and a positive voltage enabling gate applied to gated amplifier 24. With projectiles having a velocity of approximately 600 yards per second, a 400 cycle oscillation may be applied to terminal 22 and 10 cascaded counter units used in block 26 with each counter counting down by two. For a projectile having the aforementioned velocity, the elapsed time from the first coincidence to the 2500 yard mark is approximately 1.7 seconds, and the counter units in block 26 trigger coincidence disconnector flip-flop circuit 20 removing the disabling gate to gated amplifier 13 after approximately 2.6 seconds, thus preventing an output signal from gated amplifier 13 at coincidence between the range pulse and the 2500 yard range mark. The output from gated amplifier 13 fires blocking oscillator 15 upon coincidence of the range pulse and the 3500 yard range mark which triggers flip-flop circuit 21 causing the timer enabling voltage gate to stop. As this final action also leaves a disabling voltage gate on gated amplifier 13, manual reset switch 28 is used to remove this voltage gate.

The invention described in the foregoing specification need not be limited to the details shown, which are considered to be illustrative of one form the invention may take. The scope of the invention is defined by the appended claims.

What is claimed is:

1. In apparatus for measuring the velocity of a moving object over a predetermined range in response to signals from a radio pulse echo range tracking system, an interval timer comprising, a source of timing pulses of known constant repetition rate, an impulse counter, an amplifier normally biased to nonconduction interposed between said source and said counter, a time coincidence circuit responsive to signal pulses from said range tracking system for producing an output pulse in repsonse to a time coincidence of signal pulses with range marker pulses from said system, a square wave voltage gate generator responsive to a first input pulse from said coincidence circuit to initiate an output voltage square wave and a subsequent input pulse from said coincidence circuit to terminate said output wave, means for applying the output square wave of said voltage gate generator to bias said amplifier to conduction, thereby applying timing pulses from said source to said counter for the time duration of said square wave, said counter having means for producing an output pulse at a predetermined count of said timing pulses, and a second voltage gate generator coupled to said coincidence circuit and responsive to output pulses from said coincidence circuit to bias said circuit to nonconduction and responsive to said counter output pulse to restore said circuit to conduction whereby said coincidence circuit is rendered nonresponsive to pulses from said range tracking system occurring while said object is traversing a predetermined portion of said range.

2. In apparatus for measuring the velocity of a moving object over a predetermined range in response to signals from a radio pulse echo range tracking system, an interval timer comprising, a source of timing pulses of known constant repetition rate, an impulse counter, an amplifier normally biased to nonconduction interposed between said source and said counter, a time coincidence circuit responsive to signal pulses from said range tracking system for producing an output pulse in response to time coincidence of range indicating pulses from said object and range marker pulses from said system, a square wave voltage gate generator responsive to a first input pulse from said coincidence circuit to initiate an output voltage square wave and a subsequent input pulse from said coincidence circuit to terminate said output wave, means for applying the output of said square wave generator to bias said amplifier to conduction, thereby applying timing pulses from said source to said counter for the time duration of said square wave, said counter having means for producing an output pulse at a predetermined count of said timing pulses, a second voltage gate generator coupled to said coincidence circuit and responsive to output pulses from said coincidence circuit to bias said circuit to nonconduction and responsive to said counter output pulse to restore said circuit to conduction whereby said coincidence circuit is rendered nonresponsive to pulses from said range tracking system occurring while said object is traversing a predetermined portion of said range, and a manual reset switch for restoring said coincidence circuit to normal operation following the measurement of a time interval.

3. In apparatus for measuring the velocity of a moving object over a predetermined range in response to signals from a radio pulse echo range tracking system, an interval timer comprising, a source of timing pulses of known constant repetition rate, an impulse counter, an amplifier normally biased to nonconduction interposed between said source and said counter, a time coincidence detector responsive to signal pulses from said range tracking system for producing an output pulse in response to time coincidence of radio echo pulses from said object and range marker pulses from said system, a blocking oscillator responsive to the output pulse of said coincidence detector to produce an output control pulse of controlled wave form, a square wave generator responsive to a first output pulse from said blocking oscillator to initate an output voltage square wave and to a second control pulse from said blocking oscillator to terminate said output wave, means for applying the output of said square wave generator to bias said amplifier to conduction, thereby applying timing pulses from said source to said counter for the time duration of said square wave, said counter having means for producing an output pulse at a predetermined count of said timing pulses, a control circuit for said coincidence detector responsive to output pulses from said blocking oscillator to bias said detector to nonconduction and responsive to said counter output pulse to restore said detector to conduction, whereby said coincidence detector is rendered nonresponsive to pulses from said range tracking system occurring while said object is traversing a predetermined portion of said range, and a manual reset switch for restoring said switching circuit to normal operation following the measurement of a time interval.

4. An interval timer responsive to range marker voltage pulses and range indicating voltage pulses from a radio pulse echo range tracking system for timing the passage of a moving object over a predetermined range comprising, a source of timing pulses of known constant repetition rate, an impulse counter to display the number of pulses applied thereto and producing an output voltage pulse at a predetermined pulse count, an amplifier normally biased to nonconduction interposed between said pulse source and said counter, means responsive to time coincidence of range marker pulses and range indicating pulses from said range tracking system to produce a first output pulse at the time of arrival of said object at the beginning of said range and a second output pulse at the time of arrival of said object at the end of said range, means responsive to said first output pulse to bias said amplifier to conduction and to said second output pulse to restore said amplifier to nonconduction, and means responsive to said first and second output pulses to render said first-named means nonresponsive to signal pulses from said range tracking system, said last-named means being further responsive to said counter output pulse to restore said first-named means to a responsive state, whereby said interval timer is rendered nonresponsive to signal pulses and extraneous pulses from said tracking system while said object passes over a selected portion of said range and after said object passes beyond said range.

5. Apparatus responsive to signals from a radio pulse echo range tracking system for timing the passage of a moving object over a predetermined range comprising, a source of range marker voltage pulses, a time coincidence circuit having said range signal pulses and range marker pulses applied to the input thereof and producing output pulses in response to the time of arrival of said object at the beginning and the end of said range, a generator of timing pulses of known constant reptition rate, a normally nonconducting amplifier for said timing pulses, means responsive to the output pulses of said time coincidence circuit to generate a voltage square wave initiated and terminated at the beginning and end, respectively, of the time interval in which said object travels over said range, means applying said voltage square wave to said amplifier to bias said amplifier to conduction, an impulse counter coupled to the output of said amplifier for displaying the number of pulses applied thereto and responsive to a predetermined count of pulses to produce an output voltage pulse at a time less than the passage time of said object over said range, means responsive to output pulses of said coincidence circuit to bias said coincidence circuit to nonconduction, said last-named means being further responsive to said counter output pulse to restore said coincidence circuit to conduction, and a manual reset switch to restore said coincidence circuit to conduction following the measurement of a time interval.

6. In apparatus for measuring the velocity of a moving object over a predetermined range in response to signals from a radio pulse echo range tracking system, an interval timer comprising, a source of timing pulses of known constant repetition rate, a normally nonconducting amplifier for said timing pulses, a source of range marker voltage pulses, a time coincidence circuit responsive to input signal pulses from said range tracking system and said marker pulses to produce output pulses in response to the time of arrival of said object at the beginning and end of said range, a first voltage gate generator coupled to the output of said time coincidence circuit to produce a voltage square wave having a time duration equal to the time interval during which the aforesaid object passes over said range, means applying said voltage square wave to said amplifier to bias said amplifier to conduction, an impulse counter coupled to the output of said amplifier and adapted to produce an output voltage pulse in response to a selected number of input pulses applied thereto at a time less than the passage time of said object over said range, a second voltage gate generator coupled to said time coincidence circuit and to said counter and responsive to a pulse from said time coincidence circuit to initiate a voltage square wave and to a pulse from said counter to terminate the same, means applying the output voltage square wave to bias said time coincidence circuit to nonconduction whereby said coincidence circuit is made nonresponsive to input pulses occurring while said object is traversing a predetermined portion of said range and to input pulses occurring after said object has traversed said range, and a manual reset switch for restoring said voltage gate generators to normal operation following the measurement of a time interval.

7. Apparatus as defined in claim 5 wherein said time coincidence circuit includes a coincidence gated amplifier having first and second inputs, said source of range marker pulses being coupled to said first input and signal pulses from said range tracking system being coupled to said second input, time coincidence of range marker pulses with signal pulses producing an output pulse from said coincidence gated amplifier, a triggered blocking oscillator, means to amplify and couple output pulses of said coincidence gated amplifier to said blocking oscillator to trigger said oscillator thereby producing pulses of controlled wave form, and means coupling the output of said blocking oscillator to said first and second voltage gate generators.

8. Apparatus as defined in claim 7 wherein the output of said second voltage gate generator is applied to said coincidence gated amplifier to bias said coincidence gated amplifier to nonconduction for the time duration of the output voltage square wave of said second voltage gate generator.

References Cited in the file of this patent
UNITED STATES PATENTS

| Number | Name | Date |
|---|---|---|
| 2,141,343 | Campbell | Dec. 27, 1938 |
| 2,277,000 | Bingley | Mar. 17, 1942 |
| 2,332,300 | Cook | Oct. 19, 1943 |
| 2,403,918 | Grosdoff | July 16, 1946 |
| 2,414,479 | Miller | Jan. 21, 1947 |
| 2,419,570 | Labin et al. | Apr. 29, 1947 |
| 2,425,315 | Atwood et al. | Aug. 12, 1947 |
| 2,426,216 | Hight | Aug. 26, 1947 |
| 2,520,489 | Bergmar | Aug. 29, 1950 |